United States Patent Office

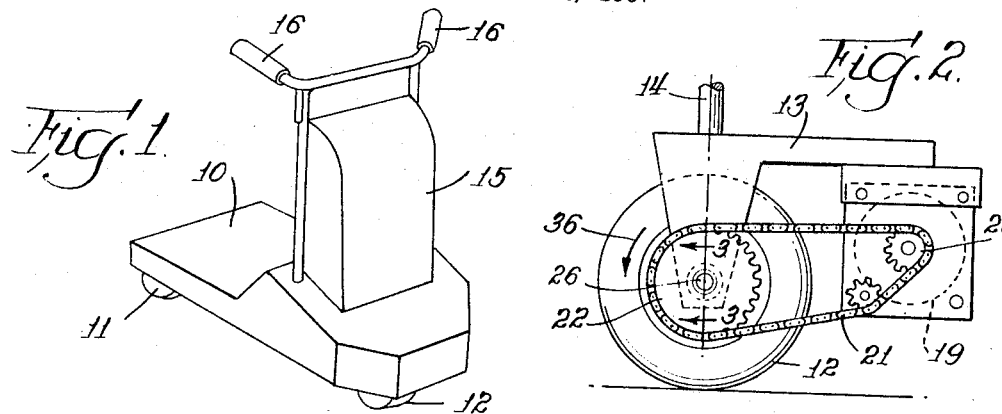
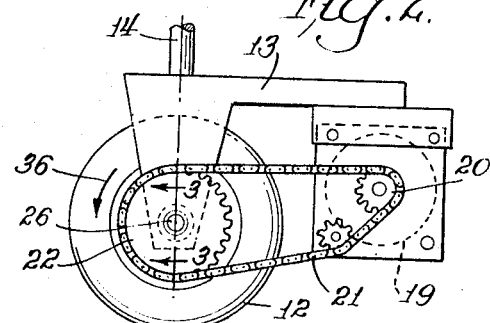
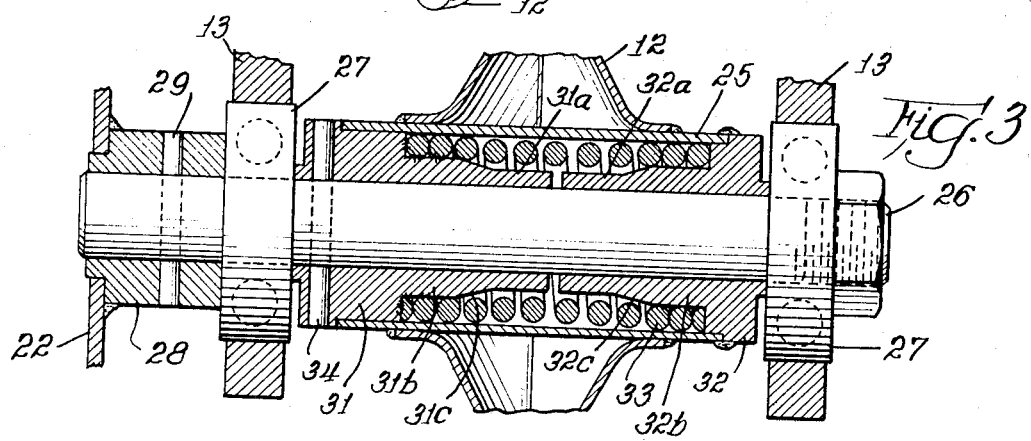
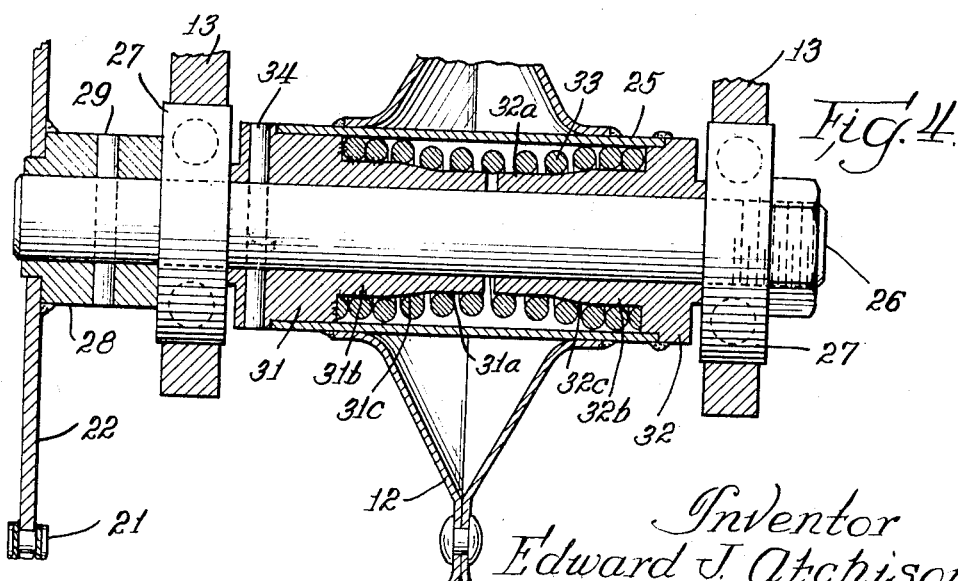
Inventor
Edward J. Atchison
By Darbo, Robertson &
Vandenburgh    Att'ys.

3,442,359
Patented May 6, 1969

3,442,359
VEHICLE DRIVE APPARATUS
Edward J. Atchison, Rte. 1, Box 202A,
Lake Zurich, Ill. 60047
Filed June 23, 1967, Ser. No. 648,316
Int. Cl. F16d 11/06, 13/04, 43/00, 23/00
U.S. Cl. 192—41                    4 Claims

ABSTRACT OF THE DISCLOSURE

A one-way clutch is provided for the drive of a battery-powered electric motor-driven vehicle. The clutch is mounted in the hub of the driving wheel and comprises two coaxially positioned members interconnected by a coil spring. The members each have a first cylindrical portion immediately adjacent to the first cylindrical portion of the other member and a larger second cylindrical portion interconnected with the first cylindrical portion by a frustum of a right-angle cone. One member is welded to the hub, the second member is attached to a drive sprocket and is welded to one end of the spring. The end parts of the spring are in contact with the second portions. The central turns of the spring have a radius, as measured from a central axis, which is smaller than the corresponding radius of the end turns and which is slightly larger than the first portions of the members.

Background of the invention

The invention relates to a one-way clutch for use with an electrically-powered vehicle. The clutch is of such a construction that when the motor has started, the spring of the clutch winds up for a turn or so before sufficient torque is developed to drive the wheel. This results in substantially less shock to the drive motor than with conventional drives. The clutch is within the hub of the driven wheel and has two axially positioned members which are interconnected in driving relationship by the spring. One end of the spring is welded to one of the members and the other end of the spring frictionally engages a part of the other member. The members extend toward each other sufficiently close so that the spring can wind up thereon and be supported thereby. This construction not only insures proper engagement of the clutch time after time, even after a substantial period of useage, but also protects the spring against excessive fatigue.

Summary of the invention

The invention relates to a one-way drive clutch for an electrically-powered vehicle, which clutch is of the coil spring engagement type.

Description of the drawings

FIG. 1 is a perspective view of a vehicle incorporating the present invention.

FIG. 2 is a elevational view of the driven wheel and drive motor in operative relationship.

FIG. 3 is an enlarged section as ensectioned through the hub of the driven wheel as viewed at line 3—3 of FIG. 2, showing the clutch in disengaged condition.

FIG. 4 is a view corresponding to FIG. 3 showing the clutch as engaged.

Description of preferred embodiment

FIG. 1 illustrates a powered cart comprising a main body section 10 with two rear supporting wheels 11. Wheels 11 are merely idler wheels. At the front is a dirigible wheel 12 mounted on a subframe 13 (FIG. 2). Shaft 14 forming a part of subframe 13 is suitably journaled in main body section 10 and is also connected to, and supports, an upper section 15. Handlebars 16 may be turned by the operator to correspondingly turn shaft 14 and subframe 13. Within upper section 15 is a battery (not shown) which powers the driving motor 19. On its output shaft, motor 19 has a small sprocket 20 which drives a roller chain 21. Chain 21 in turn drives a large sprocket 22. The arrangement is such that there is a speed reduction between the electric motor 19 and the driven wheel 12. In the illustrated embodiment this is a single step speed reduction, but in some other embodiments a double stage speed reduction will be employed. In any event the speed of rotation of the final sprocket 22 is substantially less than the speed of rotation of the motor sprocket 20.

Referring particularly to FIGURES 3 and 4, a driven wheel 12 has a hub 25. The wheel is mounted for rotation about the longitudinal axis of a shaft 26. Bearings 27 rotatively support shaft 26 in subframe 13. Sprocket 22 has a hub 28 affixed to shaft 26 by means of a pin 29.

Between shaft 26 and hub 25 in a one-way clutch formed by a first member 31, a second member 32 and an interconnecting spring 33. Member 32 is welded to hub 25. Member 31 is affixed to shaft 26 by means of a pin 34. This insures that member 31 always will rotate with sprocket 22 while member 32 will always rotate with wheel 12. Member 31 has a first cylindrical portion 31a in juxtaposition to the corresponding first cylindrical portion 32a of member 32. Spaced from the first cylindrical portions there is a second cylindrical portion 31b and a second cylindrical portion 32b on the second member 32. Cylindrical portions 31a and 31b are joined by a frustoconical portion 31c. First cylindrical portion 32a and second cylindrical portion 32b are connected by a frustoconical portion 32c. Portions 31c and 32c are frustums of a right-angle cone whose axis coincides with the axis of shaft 26. The central axis of cylindrical portions 31a, 31b, 32a and 32b also coincide with the axis of shaft 26.

The end turns of spring 33 are of a size such that they contact the second cylindrical portions 31b and 32b about the periphery thereof. At these end turns, spring 33 is welded to the first member 31. The distance between the first cylindrical portions 31a and 32a is smaller than the diameter of the wire from which spring 33 is formed. The central turns of spring 33, intermediate the ends of the spring, have a radius about the axis of shaft 26 that is smaller than the radius about the axis of shaft 26 of the end turns of the spring, even with the spring in the relaxed, disenageged, state.

The spring is coiled in such a direction that when sprocket 22 is driven by the motor in the direction indicated by arrow 36 (FIG. 2), the end of the spring in contact with cylindrical portion 32b will frictionally engage that cylindrical portion causing the spring to commence coiling from the position illustrated in FIG. 3 toward the position illustrated in FIG. 4. As the spring coils the central turns thereof decrease in radius about the axis of shaft 26 and lay down into contact with the portions 31c, 32c, 31b and 32b of the first and second members. By the time that the spring has coiled to the position illustrated in FIG. 4, sufficient torque will be developed so that member 32 and wheel 12 will rotate in unison with member 31 and sprocket 22.

In the specific embodiment hereinafter describe sprocket 22 will rotate about ½ to ¾ of a turn from the FIG. 3 position before arriving at the FIG. 4 position and the driving of wheel 12 commences. Due to the speed reduction of the preceding chain drive, this means that the motor 19 will rotate some several revolutions (depending on the amount of speed reduction) before the actual driving of wheel commences. This greatly reduces the battery drain of motor 19. There is also substantially less physical shock to the motor in starting than there is with a conventional clutch or positive drive. If sprocket 22 is rotated in the reverse of direction 36, the spring will just slip on cylindrical portion 32b without coiling up. The same result will occur if the wheel 12 were turned manually in the forward direction, i.e., not turned through the clutch.

In one embodiment the first portions 31a and 32a are ¼ inch in axial length and 0.906 inch in diameter. The second portions 31b and 32b are 13/32 inch in axial length and 0.980 inch in diameter. The frustoconical portions 31c and 32c are ¼ inch in axial length. In this embodiment, shaft 26 is ⅝ inch in diameter. Spring 33 has approximately 9.5 turns, left-hand wound, of 0.187 inch valve spring wire tempered chrome silicon SAE #9254. When coiled it has a free length of approximately 2 inches and the inside diameter of the end turns is 0.965 inch, plus or minus 0.003 inch. The end two and a half turns are close wound while the central turns are open about 1/16 of an inch. The inside and outside diameter must be burred, the spring must be free of coiling marks and all deep tool marks. The spring are stress relieved at 650° F. for thirty minutes and then shot peened for fatigue and heated to 550° F. for thirty minutes.

I claim:
1. In a vehicle apparatus driven by a battery powered electric motor connected by a speed reducing drive device to one of the wheels, the improvement in said device comprising:
   a one way clutch having a first member connected to said wheel and a second member connected to the motor, said members being coaxially positioned and rotatable with respect to each other, each member including a first portion adjacent the first portion of the other member and a second portion removed from the first portion of the other member, said members being solids of revolution about said axis with the second portions being greater in extent from the axis than are the first portions; and
   coil spring means encircling said portions with the radius about said axis of the end turns of the ends being such that said end turns are in contact with said second portions, said spring means being attached to one of said members and having central turns of a radius smaller than the radius of the end turns both when the spring is in the relaxed state and when it has tightened about said portions as the clutch engages.

2. In an apparatus as set forth in claim 1, wherein said portions are cylindrical and are connected by a transition in the shape of a frustum of a right angle cone.

3. In an apparatus as set forth in claim 2, in which said one wheel has a hub and axle, wherein said axle is coaxial with said axis, said members and spring means being between the hub and the axle, said first member being welded to the hub, said second member being said one member with the spring means welded thereto, said spring means being formed of wire of a given diameter, and having insufficient rigidity to withstand the motor torque without winding up on said members, the axial distance between said first portions being at least as small as said diameter, whereby when said motor is started said spring means will grip said first member and then twist, reducing the radius of said central turns to bring them into contact with the first portions, before sufficient torque will develop to drive said wheel thereby reducing the shock and starting current drain on the motor.

4. In an apparatus as set forth in claim 1, in which said one wheel has a hub and axle, wherein said axle is coaxial with said axis, said members and spring means being between the hub and the axle, said first member being welded to the hub, said second member being said one member with the spring means welded thereto, said spring means being formed of wire of a given diameter, and having insufficient rigidity to withstand the motor torque without winding up on said members, the axial distance between said first portions being at least as small as said diameter, whereby when said motor is started said spring means will grip said first member and then twist, reducing the radius of said central turns to bring them into contact with the first portions, before sufficient torque will develop to drive said wheel, thereby reducing the shock and starting current drain on the motor.

References Cited
UNITED STATES PATENTS

| | | | |
|---|---|---|---|
| 1,127,657 | 2/1915 | McCormick. | |
| 2,481,248 | 9/1949 | Schneider et al. | |
| 2,633,953 | 4/1953 | Gorske. | |
| 2,971,394 | 2/1961 | Christensen | 192—81 XR |
| 2,979,925 | 4/1961 | Hungerford. | |
| 3,011,605 | 12/1961 | Hungerford et al. | |
| 3,128,863 | 4/1964 | Tomko | 192—81 |
| 3,232,369 | 2/1966 | Holloway | 192—50 |

BENJAMIN W. WYCHE III, *Primary Examiner.*

LESLIE J. PAYNE, *Assistant Examiner.*

U.S. Cl X.R.

192—81